Feb. 20, 1951   L. J. PURLEE   2,542,942
TRAP
Filed Jan. 2, 1946
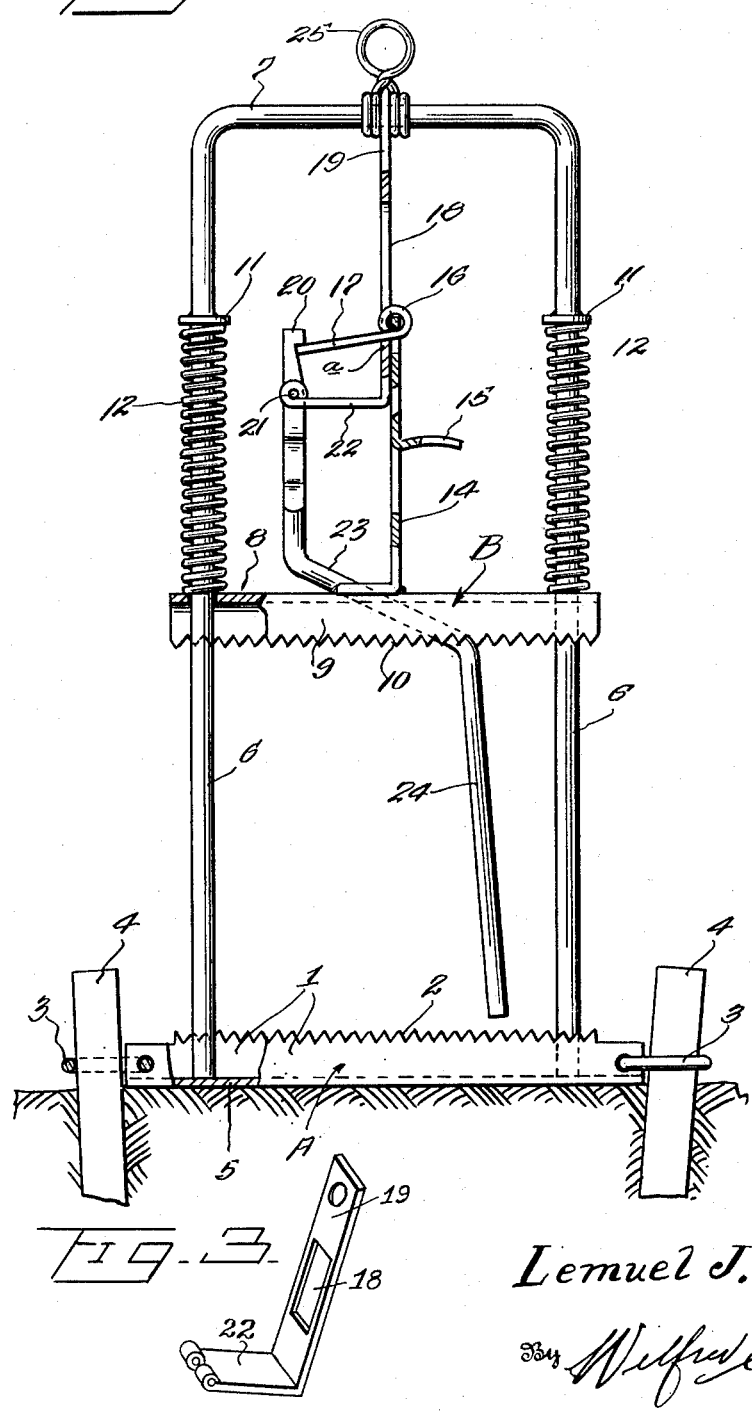
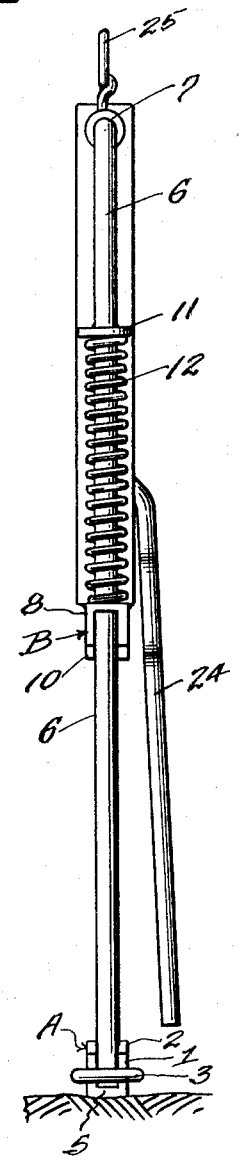
Inventor
Lemuel J. Purlee
Attorney Patented Feb. 20, 1951

2,542,942

UNITED STATES PATENT OFFICE 2,542,942

TRAP

Lemuel J. Purlee, Collinsville, Ill.

Application January 2, 1946, Serial No. 638,639

3 Claims. (Cl. 43—78)

This invention relates to traps and has relation more particularly to a device of this kind especially designed for use in the capture of fur-bearing animals although it can be employed with equal facility for the capture of rodents.

It is an object of the invention to provide a trap of an impaling or smiting type and of a character whereby the trap may be employed with equal facility in the capture of animals of different sizes within, of course, certain limitations.

Another object of the invention is to provide a trap of this kind embodying a mechanism whereby the impaling or smiting element may be effectively held in set position and in a manner to assure quick release.

A still further object of the invention is to provide a trap which eliminates the need of using bait and which is strictly humane in its action and which can be employed with equal advantage in any desired position, either on land or under water.

The invention consists in the details of construction and in the combination and arrangement of the several parts of my improved trap whereby certain important advantages are attained, as will be hereinafter more fully set forth.

In order that my invention may be better understood, I will now proceed to describe the same with reference to the accompanying drawings, wherein:

Figure 1 is a view in elevation of a trap constructed in accordance with an embodiment of the invention, with portions broken away;

Figure 2 is a view in side elevation of the device as illustrated in Figure 1; and Figure 3 is a view in perspective of the trigger supporting arm.

In the embodiment of the invention as illustrated in the accompanying drawings, A denotes what may be termed a fixed or base jaw of desired length and of a channel construction. The side flanges 1 of this jaw A have their free longitudinal margins formed to provide the teeth 2 to facilitate the action of this jaw A.

The extremities of the jaw A have operatively engaged therewith the ring-like or loop members 3 with which the pegs 4 or other elements may be engaged for maintaining the trap in desired position. As disclosed in the accompanying drawings, the trap is shown as in a substantially vertical position although, in practice, the trap will operate with the same advantage irrespective of its arrangement on land or under water.

Rigid with the opposite end portions of the intermediate part 5 of the jaw A, as by welding or otherwise as may be preferred, are the elongated and substantially parallel bars 6. These bars 6 are of desired length and are substantially at right angles to the jaw A and have their outer extremities connected by an intermediate cross member 7, preferably integral therewith. In other words, it is found of advantage to form the bars 6 and intermediate member 7 from one length of material possessing requisite rigidity and strength.

The bars 6 are freely disposed through the opposite end portions of the intermediate part 8 of a movable or impaling jaw B. This jaw B is also of a channel formation and has its side flanges 9 disposed toward the jaw A while, of course, the flanges 1 of the jaw A are directed toward this jaw B. The outer or free longitudinal marginal portions of the flanges 9 of the jaw B are also formed to provide the teeth 10.

Outwardly of the jaw B, and herein disclosed as in relatively close proximity to the intermediate member 7, the bars 6 are provided thereon with the rigid surrounding stops 11, and interposed between each of these stops 11 and the adjacent end of the jaw B is an expansible member 12, herein disclosed as a coiled spring surrounding a bar 6.

As the jaw B is moved along the bars 6 away from the jaw A, the members or springs 12 will be placed under tension and said springs are of such size to effectively impale a captive between the jaws A and B with such force as to substantially assure instant death.

The intermediate part 8 of the jaw B at substantially the longitudinal center thereof has rigidly secured thereto an elongated flat member 14 from the central portion of which is struck an outstanding finger 15 to provide means to facilitate the setting of the jaw B in its open position with respect to the jaw A.

The outer extremity of the member 14 has operatively engaged therewith as at 16, an end portion of a trigger finger 17 which has swinging or rocking movement in a direction lengthwise of the member 14. This finger 17, when the trap is set, extends through an elongated slot 18 provided in a trigger supporting arm 19 carried by the central part of the member 7.

This slot 18 is of a length, as herein embodied, greater than the length of the finger 17 and when the finger 17 is in working position, it engages and fulcrums on the lower or inner end edge *a* of the slot 18.

When in this position, the outer extremity of the finger 17 is engaged by a trigger 20 which is pivotally supported intermediate its length, as at 21, on the outer extremity of an outstanding foot-piece 22 carried by the arm 19.

The inner extremity of the trigger 20 is continued by an inwardly and laterally inclined member 23, preferably integral therewith, and which member 23 is of material length and terminates in a second elongated straight member 24, herein disclosed as arranged on an obtuse angle with respect to the member 23 which is also preferably straight.

When the jaw B is set with the finger 17 in proper engagement with the trigger 20, the member 24 is closely adjacent to one of the bars 6 but within the space between the two bars so that as an animal endeavors to pass between the bars 6, the contact of the victim with the member 24 will swing the same in a direction to move the trigger out of engagement with the finger 17, allowing the jaw B to be driven toward the jaw A to secure the victim therebetween.

It is to be stated that the trap is to be placed in such a manner as to make it reasonably sure that the victim will endeavor to pass between the bars 6.

The intermediate member 7 at its central portion carries an eye member 25 to provide a further means for securing the trap in desired position as through the instrumentality of a wire or other flexible or pliable member and the securement of this eye member 25 to the member 7 is such as to assure the maintenance of the arm 19 in desired position on the member 7.

From the foregoing description it is thought to be obvious that a trap constructed in accordance with my invention is particularly well adapted for use by reason of the convenience and facility with which it may be assembled and operated.

I claim:

1. A trap comprising a base jaw, substantially parallel bars rigid with opposite end portions of the base jaw, a striking jaw slidably connected to the bars, expansible means for urging the striking jaw toward the base jaw, a member connecting the bars upon the side of the sliding jaw opposite from the base jaw, a trigger supporting arm carried by the connecting member and extending between the bars toward the striking jaw, said arm having a slot disposed lengthwise thereof, a member carried by the sliding jaw, a trigger finger pivotally connected to the sliding jaw carried member for extension through the slot of the arm, a trigger carried by the arm for releasable engagement with the trigger finger to maintain the sliding jaw in set position, and means carried by the trigger for contact by a victim for freeing the trigger from the trigger finger, said trigger finger, when engaged with the trigger, being fulcrumed across the end edge of the slot of the arm nearest the jaws.

2. A trap as set forth in claim 1, wherein the means for releasing the trigger comprises an elongated straight member carried by the trigger and disposed to one side thereof and between the bars.

3. A trap of the character described comprising a pair of spaced bar members disposed in substantially parallel relation, a fixed jaw connecting adjacent ends of the bar members, a movable jaw slidably supported by the bar members to move longitudinally thereof relative to the fixed jaw, resilient means normally urging movement of the movable jaw toward the fixed jaw, a support connected with the bar members upon the side of the movable jaw remote from the fixed jaw, a trigger pivotally mounted upon the support, a relatively long actuating bar member connected with the trigger and extending therefrom across one side of the movable jaw toward the fixed jaw, a trigger finger pivotally coupled with the movable jaw and adapted to be engaged by the trigger when the movable jaw is retracted against the tension of the resilient means, and means forming a part of the trigger support providing a fulcrum for the trigger finger to maintain the finger and trigger in engaged relation.

LEMUEL J. PURLEE.

REFERENCES CITED

The following references are of record in the file of this patent:

UNITED STATES PATENTS

| Number | Name | Date |
|---|---|---|
| 27,967 | Buxton | Apr. 24, 1860 |
| 983,181 | Tharp | Jan. 31, 1911 |
| 995,493 | Stephens et al. | June 20, 1911 |
| 1,584,677 | Stacy | May 11, 1926 |